(12) United States Patent
Leigh et al.

(10) Patent No.: US 10,468,794 B2
(45) Date of Patent: Nov. 5, 2019

(54) TRANSCEIVER MODULE

(71) Applicant: Hewlett Packard Enterprise Development LP, Houston, TX (US)

(72) Inventors: Kevin Leigh, Houston, TX (US); John Norton, Houston, TX (US); George Megason, Spring, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/569,278

(22) PCT Filed: Jul. 30, 2015

(86) PCT No.: PCT/US2015/042890
§ 371 (c)(1),
(2) Date: Oct. 25, 2017

(87) PCT Pub. No.: WO2017/019085
PCT Pub. Date: Feb. 2, 2017

(65) Prior Publication Data
US 2018/0123268 A1    May 3, 2018

(51) Int. Cl.
*H01R 12/70* (2011.01)
*G02B 6/36* (2006.01)
(Continued)

(52) U.S. Cl.
CPC .......... *H01R 12/7005* (2013.01); *G02B 6/36* (2013.01); *G02B 6/4246* (2013.01);
(Continued)

(58) Field of Classification Search
CPC ...... G02B 6/36; G02B 6/4246; G02B 6/4261; G02B 6/4277; G02B 6/4284;
(Continued)

(56) References Cited

U.S. PATENT DOCUMENTS 5,879,173 A * 3/1999 Poplawski ........... G02B 6/4246
439/138
6,074,228 A * 6/2000 Berg ...................... H01R 12/57
385/75
(Continued)

FOREIGN PATENT DOCUMENTS

CN    1836181 A    9/2006
EP    0863581 A1   9/1998

OTHER PUBLICATIONS

International Search Report and Written Opinion received for PCT Patent Application No. PCT/US2015/042890, dated Apr. 28, 2016, 10 pages.

(Continued)

*Primary Examiner* — Edwin A. Leon
*Assistant Examiner* — Milagros Jeancharles
(74) *Attorney, Agent, or Firm* — Dicke, Billig & Czaja, PLLC

(57) ABSTRACT

One example of a system includes a system board including first contacts and second contacts and a cage attached to the system board. The cage includes a first side over the first contacts and a second side over the second contacts. A first lever is coupled to the first side of the cage and pivotable with respect to the cage. A second lever is coupled to the second side of the cage and pivotable with respect to the cage. A removable transceiver module includes third contacts. The transceiver module is installable in at least one of the first side and the second side of the cage using at least one of the first lever and the second lever.

15 Claims, 18 Drawing Sheets

(51) Int. Cl.
*H01R 12/71* (2011.01)
*H01R 13/518* (2006.01)
*H01R 13/629* (2006.01)
*G02B 6/42* (2006.01)

(52) U.S. Cl.
CPC ......... *G02B 6/4261* (2013.01); *G02B 6/4277* (2013.01); *G02B 6/4284* (2013.01); *H01R 12/716* (2013.01); *H01R 13/518* (2013.01); *H01R 13/62933* (2013.01); *H01R 2201/04* (2013.01)

(58) Field of Classification Search
CPC .............. H01R 12/7005; H01R 12/716; H01R 13/518; H01R 13/62933
USPC .......... 439/374, 76.1, 607.09, 607.2, 607.21, 439/607.23, 607.24, 157–160; 385/53, 385/88–94
See application file for complete search history.

(56) References Cited

U.S. PATENT DOCUMENTS

| | | | |
|---|---|---|---|
| 6,229,708 B1 | 5/2001 | Corbin, Jr. et al. | |
| 6,302,714 B1 | 10/2001 | Bolognia et al. | |
| 6,824,416 B2 | 11/2004 | Di Mascio | |
| 6,830,385 B2 | 12/2004 | Ishigami | |
| 6,846,115 B1 | 1/2005 | Shang | |
| 6,855,558 B1* | 2/2005 | Hattori | H01R 13/62933 385/53 |
| 6,857,788 B1* | 2/2005 | Dugas | G02B 6/3897 385/75 |
| 6,935,882 B2 | 8/2005 | Hanley | |
| 6,966,703 B1* | 11/2005 | Lebby | G02B 6/4292 385/76 |
| 6,986,679 B1* | 1/2006 | Aronson | H01R 25/00 439/170 |
| 7,040,911 B1* | 5/2006 | Ho | G02B 6/4292 439/352 |
| 7,227,745 B2* | 6/2007 | Kowalkowski | G02B 6/4246 361/679.33 |
| 7,255,495 B2* | 8/2007 | Yi | G02B 6/4201 385/88 |
| 7,317,862 B2* | 1/2008 | Minota | G02B 6/4292 385/134 |
| 7,347,633 B2* | 3/2008 | Minota | G02B 6/3897 385/53 |
| 7,507,111 B2 | 3/2009 | Togami | |
| 7,625,135 B2 | 12/2009 | Dodds | |
| 8,613,630 B2* | 12/2013 | Henry | G02B 6/4261 439/372 |
| 9,291,782 B2* | 3/2016 | Skepnek | G02B 6/4201 |
| 9,320,160 B2* | 4/2016 | Dudemaine | H05K 5/0217 |
| 9,379,484 B2* | 6/2016 | Phillips | H01R 13/62905 |
| 2003/0171022 A1* | 9/2003 | Distad | G02B 6/4261 439/372 |
| 2004/0240792 A1* | 12/2004 | Minota | G02B 6/3897 385/53 |
| 2005/0036743 A1 | 2/2005 | Dugas | |
| 2005/0220425 A1* | 10/2005 | Kropp | G02B 6/4292 385/88 |
| 2006/0029332 A1* | 2/2006 | Chiu | G02B 6/3893 385/53 |
| 2008/0187271 A1* | 8/2008 | Miyoshi | G02B 6/4201 385/92 |
| 2008/0188104 A1* | 8/2008 | Endou | G02B 6/4201 439/157 |
| 2009/0202207 A1 | 8/2009 | Grzegorzewska et al. | |
| 2011/0170832 A1* | 7/2011 | Yamai | G02B 6/4201 385/92 |
| 2013/0210275 A1 | 8/2013 | Fish et al. | |
| 2013/0217256 A1 | 8/2013 | Dudemaine et al. | |
| 2014/0340487 A1* | 11/2014 | Gilliland | G01S 7/4863 348/48 |
| 2015/0180171 A1* | 6/2015 | Okabe | G02B 6/4261 439/342 |
| 2015/0241646 A1* | 8/2015 | Wang | G02B 6/423 385/92 |
| 2018/0049342 A1* | 2/2018 | Allen | H05K 7/1487 |
| 2019/0146167 A1* | 5/2019 | Leigh | G02B 6/4246 |

OTHER PUBLICATIONS

International Preliminary Report on Patentability received for PCT Patent Application No. PCT/US2015/042890, dated Feb. 8, 2018, 9 pages.

European Search Report and Search Opinion Received for EP Application No. 15899875.7, dated Oct. 4, 2018, 8 pages.

* cited by examiner

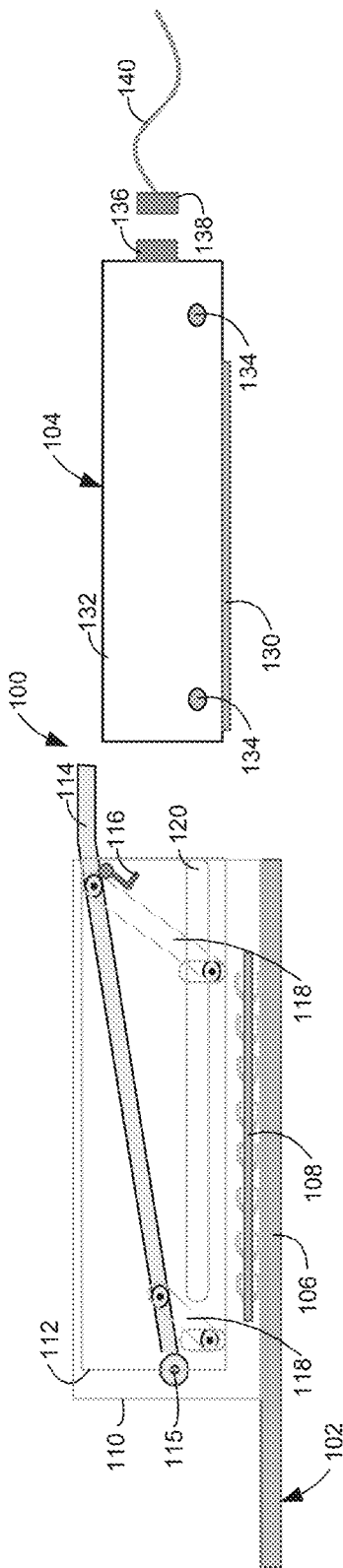
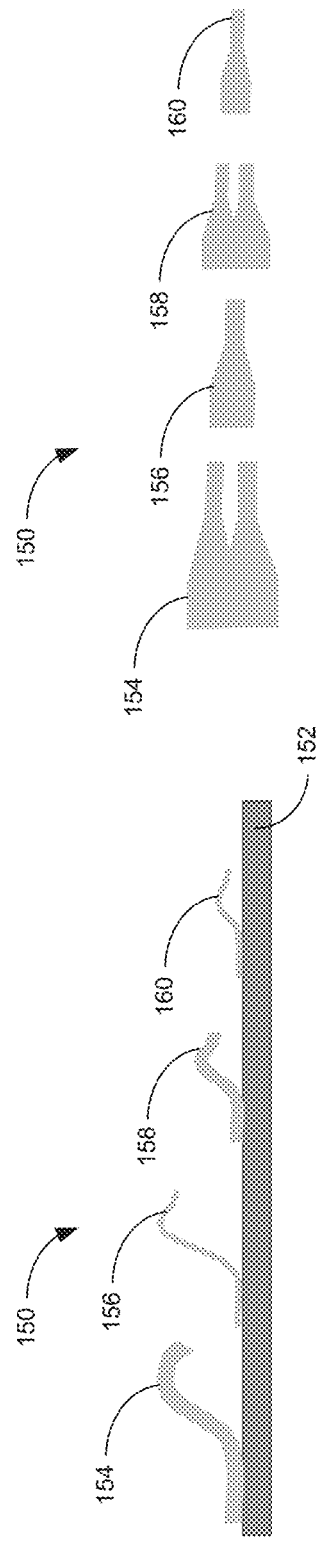
Fig. 1
Fig. 2A
Fig. 2B

TRANSCEIVER MODULE

BACKGROUND

Hot-pluggable transceiver modules, such as 1-lane Small Form-Factor Pluggable (SFP), 4-lane Quad Small Form-Factor Pluggable (QSFP), and 12-lane CXP, are used for network data communications. The transceiver modules are hot-pluggable to a system board, such as a printed circuit board of a switch module. A system board is typically behind a faceplate where connectors for coupling communication cables (e.g., fiber optic cables) to the transceiver modules are arranged.

BRIEF DESCRIPTION OF THE DRAWINGS

FIG. 1 illustrates a side view of one example of a system.

FIG. 2A illustrates a side view and FIG. 2B illustrates a top view of one example of spring contacts of a substrate.

DETAILED DESCRIPTION

Figure 3A:
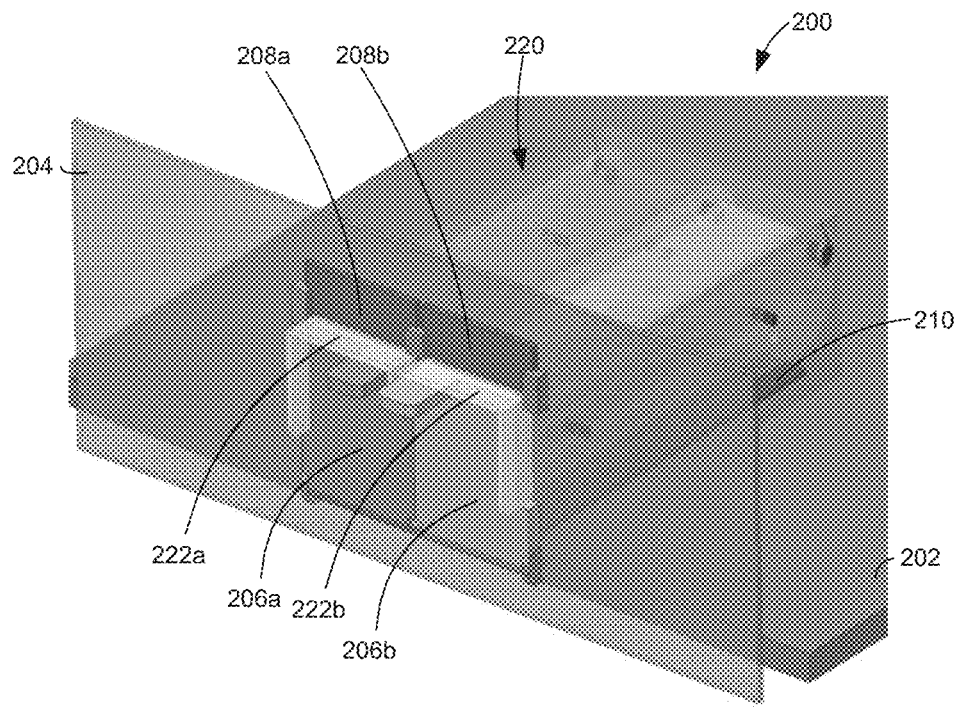
FIG. 3A illustrates an isometric view and FIG. 3B illustrates a side view of one example of a system including a transceiver cage assembly.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

A transceiver module includes a set of components for receiving communication signals from a first side of the module, a set of components for transmitting communication signals to the first side of the module, a set of components for transmitting communication signals to a second side of the module, and a set of components for receiving communication signals from the second side of the module. The transmitting and receiving components for the first side of the module may be electronic components. The transmitting and receiving components for the second side of the module may be electro-optical components.

Hot-pluggable transceiver modules, such as 12-lane CXP and 16-lane CDFP, are difficult to cool and occupy a significant amount of space on a system board, thereby limiting the use of other electronic components on the system board. The transceiver modules are typically coupled to a system board via right-angled blindmate connectors, which also occupy significant space on a system board, thereby limiting the implementation of high lane-count transceivers (e.g., beyond 16 lanes). To minimize the system board space usage, the 12-lane CXP and the 16-lane CDFP pluggable transceiver modules use two Printed Circuit Boards (PCBs)—one PCB is for transmitter components and the other PCB is for receiver components. The transceiver modules also occupy a significant amount of faceplate space, thereby limiting the connector density. Each transceiver module has a fixed lane-count. Therefore, break-out cables (e.g., a 124-lane CXP to three 4-lane QSFPs) are used to connect a larger lane-count pluggable transceiver module to smaller lane-count systems.

Mid-board optics (MBO) transceivers enable higher faceplate optical connector density and have lower electrical and mechanical overheads compared to hot-pluggable transceiver modules. In addition, MBOs may be cooled easier and may enable better signal integrity than hot-pluggable transceiver modules since the heat sink of the MBO chips is fully exposed to air flow and the MBOs may be placed more flexibly on a system board. MBAs, however, are pre-installed in a system and are not serviceable without removing the system from service.

Accordingly, this disclosure describes Dual Actuated-Lever Pluggable (DALP) transceiver modules and systems for receiving the DALP transceiver modules. A DALP transceiver module as described herein may be hot-pluggable and thus transceivers may be easily replaced for servicing or for different lane-count transceivers and/or different lane-count cable connectors. A system for receiving a DALP transceiver module includes a system board (e.g., PCB) and a cage mounted on the system board that can accept DALP transceiver modules by using the surface of the system board for contacts (e.g., pad array or chip socket).

FIG. 1 illustrates a side view of one example of a system 100. System 100 includes a device 102, such as a switch module, and a removable transceiver module 104 (i.e., a DALP transceiver module). Device 102 includes a system board 106 (e.g., PCB), a socket contact assembly 108, a cage 110, a first carrier 112, a second carrier (not shown), a first lever 114, a second lever (not shown), a first lever lock 116, and a second lever lock (not shown). The second carrier, the second lever, and the second lever lock are similar to the illustrated first carrier 112, first lever 114, and first lever lock 116.

Socket contact assembly 108 includes a plurality of contacts to electrically couple system board 106 to transceiver module 104. In one example as shown in FIG. 1, socket contact assembly 108 may include spring contacts on the bottom side of the socket contact assembly for the socket contact assembly 108 to be modularly coupled to system board 106. In another example, socket contact assembly 108 may include solder balls (not shown) on the bottom side of the socket contact assembly for the socket contact assembly 108 to be permanently coupled to system board 106. Cage 110 is attached to system board 106 over socket contact assembly 108.

Carrier 112 is within cage 110 and vertically movable with respect to cage 110. Carrier 112 includes rails 120 for receiving transceiver module 104. Carrier 112 also includes lever-action blindmate mechanisms 118 to move carrier 112 vertically relative to cage 110. With transceiver module 104 within carrier 112, transceiver module 104 may be blindmated to socket contact assembly 108 on system board 106 by moving carrier 112 from a first (i.e., up position) to a second (i.e., down) position using lever 114.

Lever 114 is between carrier 112 and cage 110 and pivotable with respect to cage 110 at lever hinge 115. Lever 114 may be moved to a first (i.e., up) position to enable insertion and removal of transceiver module 104 into cage 110. With lever 114 in the first position, transceiver module 104 may be inserted laterally into cage 110 and approximately aligned with socket contact assembly 108 on system board 106. Lever 114 may be moved to a second (i.e., down) position to electrically couple transceiver module 104 to system board 106 via socket contact assembly 108. Transceiver module 104 and socket contact assembly 108 may include final alignment features for transceiver module 104 to blindmate to socket contact assembly 108 when lever 114 is moved to the second position. With lever 114 in the second position, lever lock 116 may be used to latch lever 114 such that lever 114 is maintained in the second position.

In one example, transceiver module 104 may be a 1x transceiver module that may be installed into either one of the two carriers of device 102. In another example, transceiver module 104 may be a 2x transceiver module that may be installed in both of the carriers of device 102. A 2x transceiver module may include twice as many lanes as a 1x transceiver module. Transceiver module 104 includes a module board 130 (e.g., PCB or substrate), a module hood 132, and an optical or electrical connector 136. Module hood 132 is attached to module board 130 and encloses transceiver devices (not shown), which are electrically coupled to module board 130. Module hood 132 includes guides 134 on the sides of module hood 132, which are received by rails 120 of carrier 112 when transceiver module 104 is installed in device 102. Electrical or optical connector 136 is electrically or optically coupled to the transceiver devices enclosed by module hood 132, respectively. An electrical or optical cable 140 terminated to an electrical or optical connector 138 may be electrically or optically coupled to electrical or optical connector 136, respectively. 100361
FIG. 2A illustrates a side view and FIG. 2B illustrates a top view of one example of spring contacts 150 of a substrate 152. Spring contacts 150 may be used for contacts of a socket contact assembly, such as socket contact assembly 108 (FIG. 1). Contacts 150 have different heights for hot blindmating. For example, contact 154 may be a ground contact, contact 156 may be an ID contact, contact 158 may be a power contact, and contact 160 may be a signal or present contact.

Contact 154 may have the same height as contact 156. Contact 156 has a greater height than contact 158, and contact 158 has a greater height than contact 160. The contacts 150 may have different shapes (and/or thickness) as illustrated in FIG. 2B in addition to different heights as illustrated in FIG. 2A to maintain consistent compression force while providing adequate performance (e.g., adequate electrical current capacity for power contacts or characteristic impedance for high-speed signal contacts). The contact pads that blindmate to contacts 150 have a size large enough for contacts 150 to slide as the contacts are compressed during blindmating.

Figure 3B:
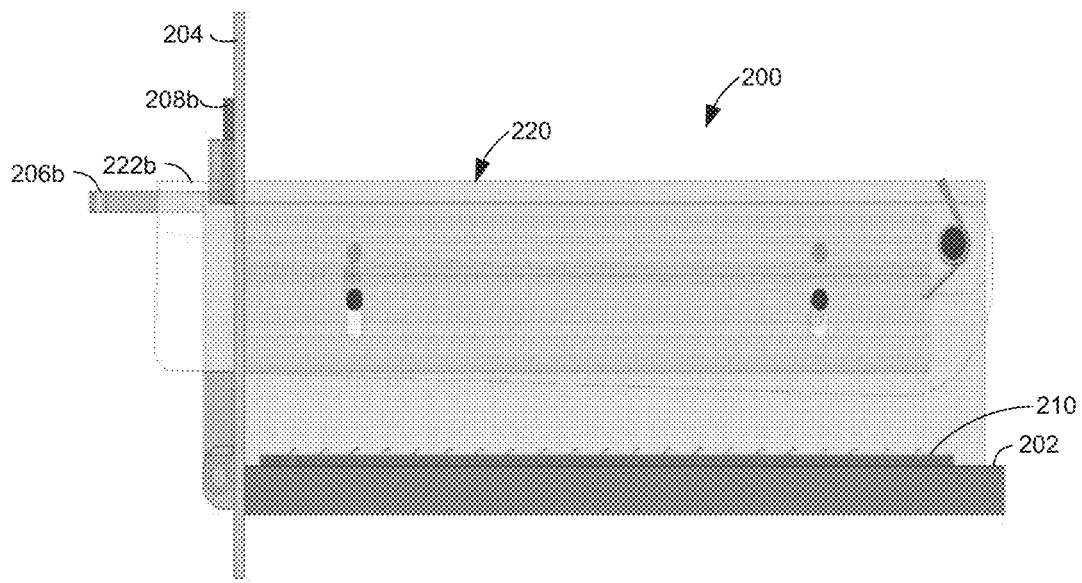

FIG. 3A illustrates an isometric view and FIG. 3B illustrates a side view of one example of a system 200 including a transceiver cage assembly 220. System 200 includes a system board 202, a faceplate 204 perpendicular to system board 202, and a transceiver cage assembly 220. Transceiver cage assembly 220 includes a first side including a first lever 222a and a second side including a second lever 222b. Transceiver cage assembly 220 will be described in further detail below with reference to the following figures.

System board 202 includes a socket contact assembly 210 for electrically coupling a transceiver module to system 200. Socket contact assembly 210 includes first contacts to electrically couple a transceiver module installed in the first side of transceiver cage assembly 220 to system board 202 and second contacts to electrically couple a transceiver module installed in the second side of the transceiver cage assembly 220 to system board 202. The first contacts and the second contacts of socket contact assembly 210 may be implemented together as one PCB or separately as two PCBs. System board 202 may also include a switch chip (not shown) electrically coupled to socket contact assembly 210 through system board 202. Transceiver cage assembly 220 is attached to system board 202 over socket contact assembly 210.

A first cover 206a, a second cover 206b, a first sliding lid 208a, and a second sliding lid 208b are coupled to faceplate 204. Each cover 206a and 206b is individually pivotable with respect to faceplate 204 to a closed position over an opening of a respective side of transceiver cage assembly 220. As illustrated in FIGS. 3A and 3B, when a transceiver module is not installed in transceiver cage assembly 220, each cover 206a and 206b is in the closed position to prevent air flow and EMI/RFI leakage from the system. Each cover 206a and 206b is individually pivotable with respect to faceplate 204 to an open position (illustrated in FIG. 5) when a transceiver module is installed in transceiver cage assembly 220.

Each lever 222a and 222b individually extends from faceplate 204. First sliding lid 208a is coupled to faceplate 204 above first lever 222*a* and movable with respect to faceplate 204. Second sliding lid 208*b* is coupled to faceplate 204 above second lever 222*b* and movable with respect to faceplate 204. Each sliding lid 208*a* and 208*b* is individually movable to a first (i.e., up) position when the corresponding lever 222*a* and 222*b* is in the first (i.e., up) position. Each sliding lid 208*a* and 208*b* is individually movable to a second (i.e., down) position when the corresponding lever 222*a* and 222*b* is in the second (i.e., down) position. When a sliding lid is in the second position, the sliding lid prevents air flow and EMI/RFI leakage from the system through and around an installed transceiver module.

Figure 4:
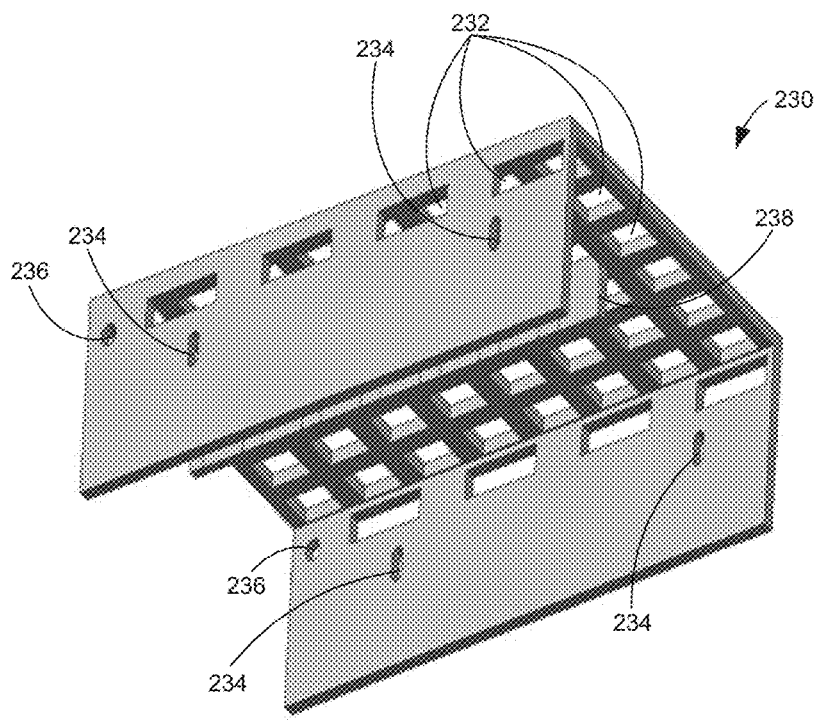
FIG. 4 illustrates an isometric view of one example of a transceiver cage.

FIG. 4 illustrates an isometric view of one example of a transceiver cage 230. Transceiver cage 230 is part of transceiver cage assembly 220 (FIGS. 3A and 3B). Cage 230 includes a top wall extending between a first side wall and a second side wall parallel to the first side wall. The top wall and the first and second side walls may include a plurality of openings 232 to allow air to flow to a transceiver module installed in transceiver cage 230. The first and second side walls of cage 230 include cage slots 234 for receiving guide pins of a first carrier and a second carrier, respectively, of transceiver cage assembly 220 as will be described below with reference to FIG. 5. The first and second side walls of cage 230 also include openings 236 for receiving lever hinges of first lever 222*a* and second lever 222*b*, respectively. Cage 230 includes a center partial wall 238 suspended from the top wall of cage 230 and parallel to the first and second side walls. Center partial wall 238 includes slots (not shown) for receiving guide pins of the first carrier and the second carrier. Center partial wall 238 also includes openings (not shown) for receiving lever hinges of first lever 222*a* and second lever 222*b*.

Figure 5:
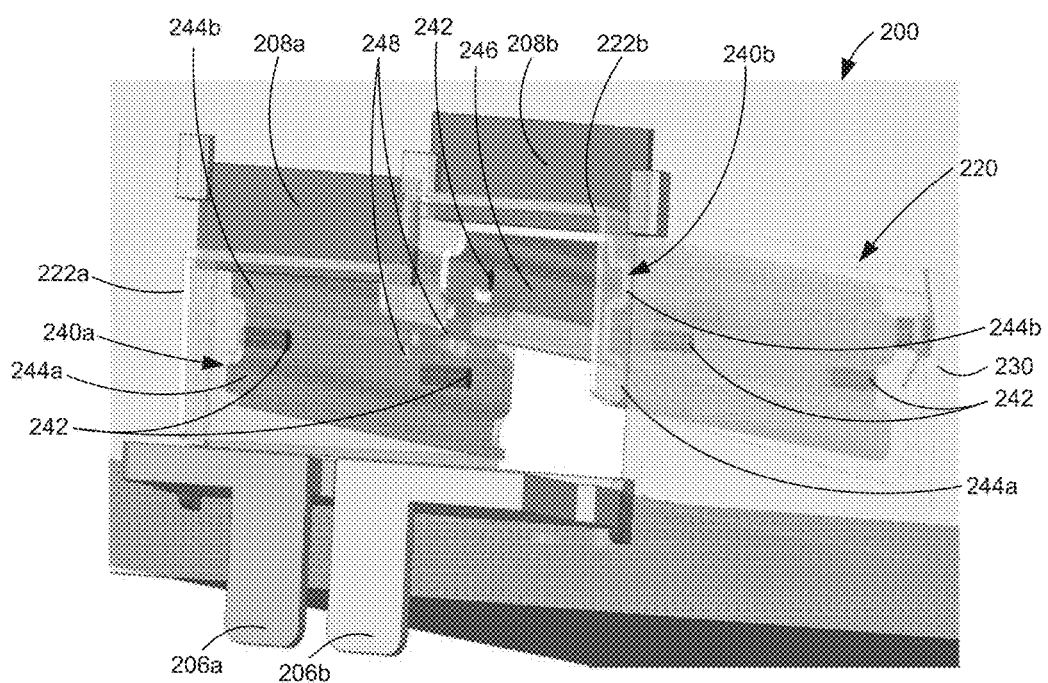
FIG. 5 illustrates one example of a system including a transceiver cage assembly.

FIG. 5 illustrates one example of system 200 including transceiver cage assembly 220. Transceiver cage assembly 220 includes a first carrier 240*a* on a first side of the transceiver cage assembly and a second carrier 240*b* on a second side of the transceiver cage assembly. Carrier 240*a* is illustrated with lever 222*a* and sliding lid 208*a* in the second (i.e., down) position. Carrier 240*b* is illustrated with lever 222*b* and sliding lid 208*b* in the first (i.e., up) position. Transceiver cage assembly 220 may include mounting mechanisms (not shown) to mechanically attach transceiver cage assembly 220 to the system board.

Each carrier 240*a* and 240*b* includes a top wall extending between an outer side wall and an inner partial side wall parallel to the outer side wall. The top wall and the outer and inner side walls may include a plurality of openings (not shown) to allow air to flow to a transceiver module installed in transceiver cage assembly 220. Guide pins 242 extend from the outer and inner side walls of each carrier 240*a* and 240*b*. Each carrier 240*a* and 204*b* is within cage 230 and individually movable with respect to cage 230 between a first position in which each carrier guide pin 242 is at the top of each corresponding cage slot 234 and a second position in which each carrier guide pin 242 is at the bottom of each corresponding cage slot 234.

The outer side wall of each carrier 240*a* and 240*b* includes carrier rails 244*a* and 244*b* extending parallel to the corresponding carrier 240*a* and 240*b*. The inner side wall of each carrier 240*a* and 240*b* includes a carrier rail 246 opposite to the carrier rail 244*b* and extending parallel to the corresponding carrier 240*a* and 240*b*. Carrier rails 244*b* and 246 on opposite side walls of each carrier 240*a* and 240*b* may extend in a common first plane at the top of the outer and inner side walls of the corresponding carrier 240*a* and 240*b*. Carrier rails 244*a*, 244*b*, and 246 are for receiving guide rails of a transceiver module as will be described below with reference to the following figures.

The inner side wall of each carrier 240*a* and 240*b* includes a locking mechanism 248. When a 2x transceiver module is installed in transceiver cage assembly 220, locking mechanism 248 of each carrier 240*a* and 240*b* is engaged by the transceiver module so that first lever 222*a* and second lever 222*b* and first carrier 240*a* and second carrier 240*b* move together.

Figure 6A:
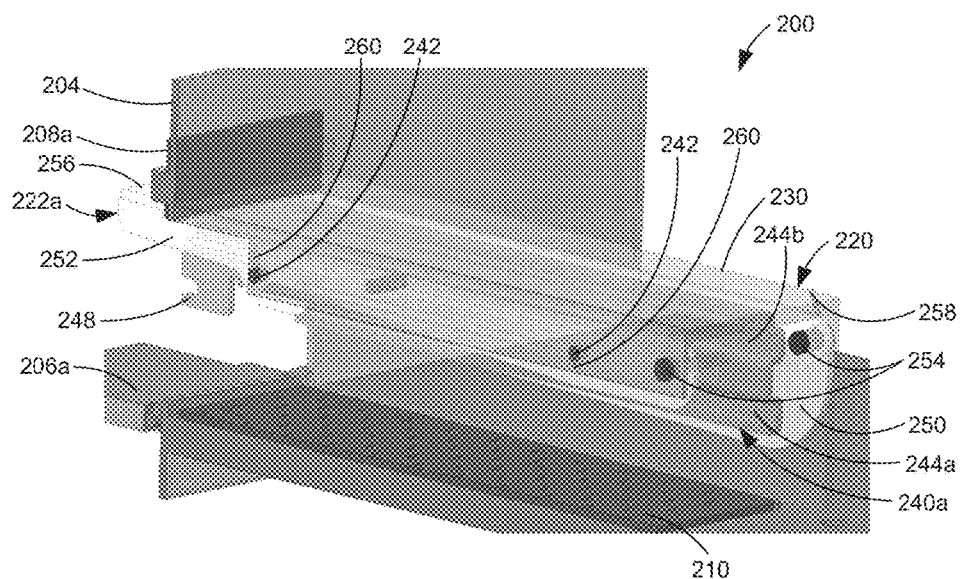
FIGS. 6A and 6B illustrate cross-sectional views of one example of a system including a portion of the transceiver cage assembly.
Figure 6B:
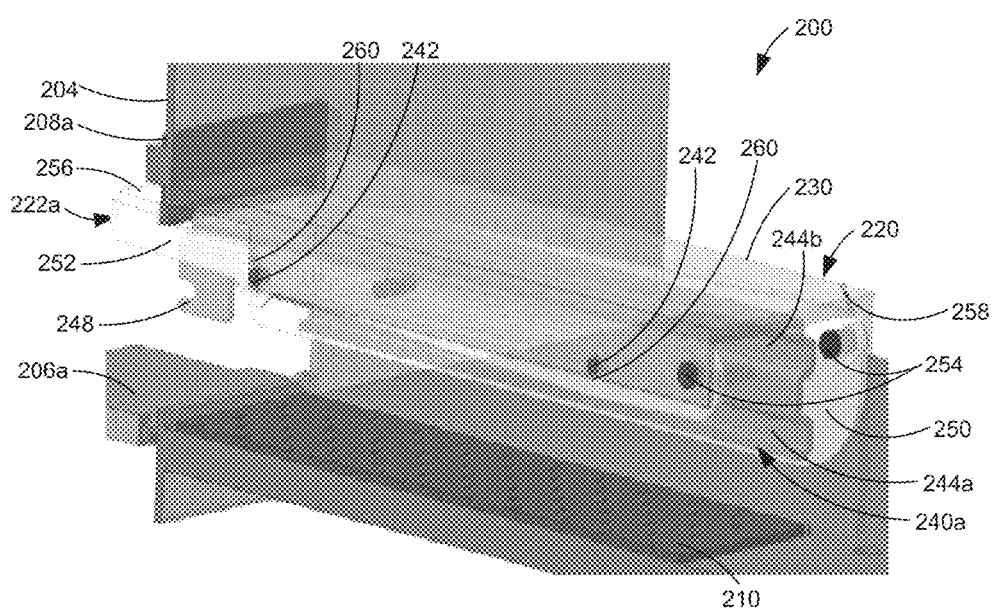

FIGS. 6A and 6B illustrate cross-sectional views of one example of system 200 including a portion of transceiver cage assembly 220. The features illustrated in FIGS. 6A and 6B are also illustrated in FIG. 20B from a different view. The portion illustrated in FIGS. 6A and 6B includes first lever 222*a*. Second lever 222*b* includes similar features as those illustrated for first lever 222*a*. Lever 222*a* is between cage 230 and carrier 240*a* and pivotable with respect to cage 230. Lever 222*a* includes an outer lever arm 250, an inner lever arm 252, lever hinges 254, and a lever handle 256. Lever handle 256 extends outside of cage 230 to enable a user to actuate lever 222*a*. Each lever arm 250 and 252 is parallel to the side walls of cage 230 and the side walls of carrier 240*a*. Each lever arm 250 and 252 includes slots 260 through which guide pins 242 of carrier 240*a* extend though to slots 234 (FIG. 4) of cage 230. The back end of each lever arm 250 and 254 opposite to handle 256 is movably coupled to cage 230 via a lever hinge 254 extending through an opening 236 (FIG. 4) of cage 230.

At least one lever hinge 254 of lever 222*a* includes a lever spring 258. Lever spring 258 maintains lever 222*a* in the first position as illustrated in FIG. 6A when a transceiver module is not installed in carrier 240*a* of transceiver cage assembly 220. A transceiver module may be laterally inserted into carrier 240*a* of transceiver cage assembly 220 with lever 222*a* in the first position. Lever 222*a* may be pivoted to the second position as illustrated in FIG. 6B after a transceiver module has been laterally inserted into carrier 240*a* of transceiver cage assembly 220. When lever 222*a* is moved to the first (i.e., up) position, carrier 240*a* is moved to the first position as illustrated in FIG. 6A. When lever 222*a* is moved to the second (i.e., down) position, carrier 240*a* is moved to the second position as illustrated in FIG. 6B.

Figure 7A:
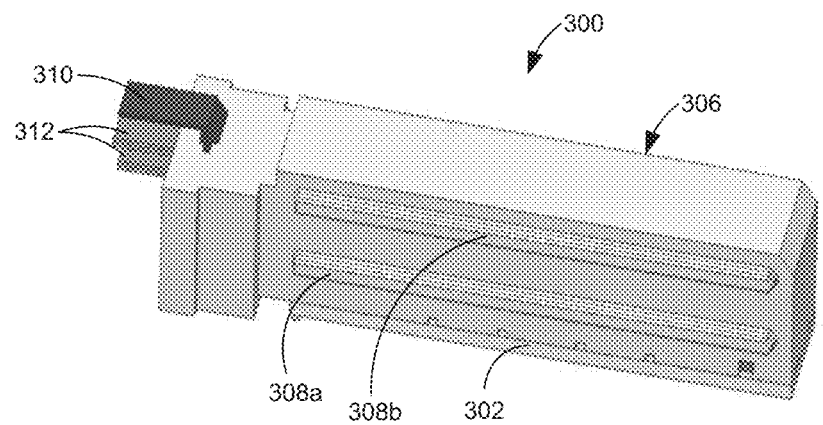
FIGS. 7A-7C illustrate various views of one example of a 1× removable transceiver module.
Figure 7B:
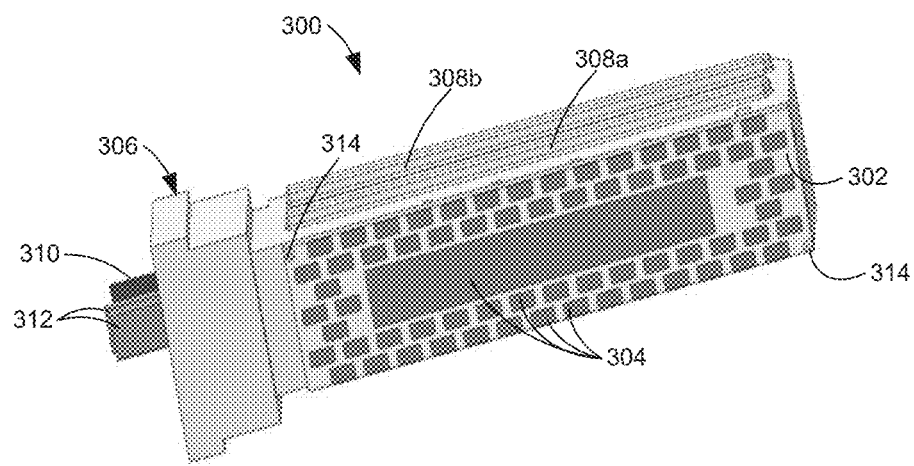
Figure 7C:
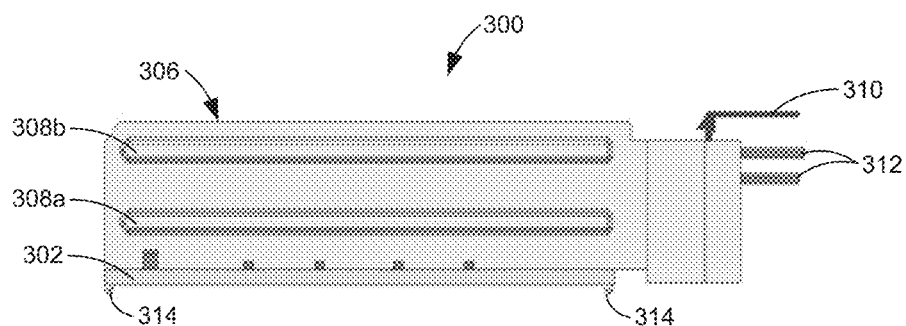

FIG. 7A illustrates a top isometric view, FIG. 7B illustrates a bottom isometric view, and FIG. 7C illustrates a side view of one example of a 1x removable transceiver module 300 (i.e., a 1x DALP transceiver module). Transceiver module 300 includes a module board 302, a module hood 306, a handle 310, and optical cables 312. Module board 302 includes an array of parallel-plane-mating contacts 304 to electrically couple transceiver module 300 to a system. Module board 302 also includes final alignment pins 314 for aligning contacts 304 to a system board of a system. Transceiver devices (illustrated in FIGS. 8A and 8B) are electrically coupled to module board 302 and optically coupled to optical cables 312. Optical cables 312 may be fix-coupled to the transceivers for active optical cable (AOC) applications. In other examples, optical cables 312 may be coupled to the transceivers and terminated on optical connectors (not shown) attached to module hood 306 for external optical cables (not shown) to be modularly coupled to removable transceiver module 300.

Module hood 306 is attached to module board 302 and encloses the transceiver devices. Module hood 306 applies even pressure on module board 302 when transceiver module 300 is in the second position inside transceiver cage assembly 220. In one example, module hood 306 may include a heat sink material. In another example, module hood 306 may include openings such that air flow within a system may cool the transceivers. Module hood 306 includes guide rails 308a and 308b. A first guide rail 308a and a first guide rail 308b are arranged on a first side of module hood 306 and extend parallel to module board 302. A second guide rail 308a and a second guide rail 308b are arranged on a second side of module hood 306 opposite to the first side and extend parallel to module board 302. Guide rails 308a on opposite sides of module hood 306 extend in a common first plane a first distance from module board 302. Guide rails 308b on opposite sides of module hood 306 extend in a common second plane a second distance from module board 302 greater than the first distance. Handle 310 is attached to and extends from the top of module hood 306 towards the front of transceiver module 300 where optical cables 312 are located. Handle 310 may be used to install transceiver module 300 in a system and to remove transceiver module 300 from a system.

Figure 8A:
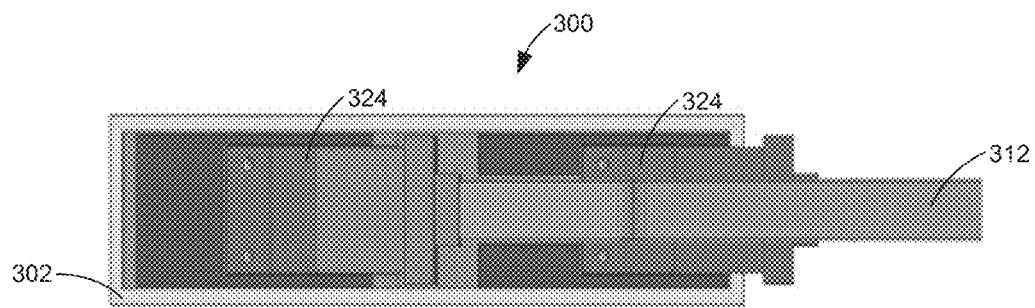
FIG. 8A illustrates a top view and FIG. 8B illustrates a side view of one example of a 1× removable transceiver module with the module hood removed.
Figure 8B:
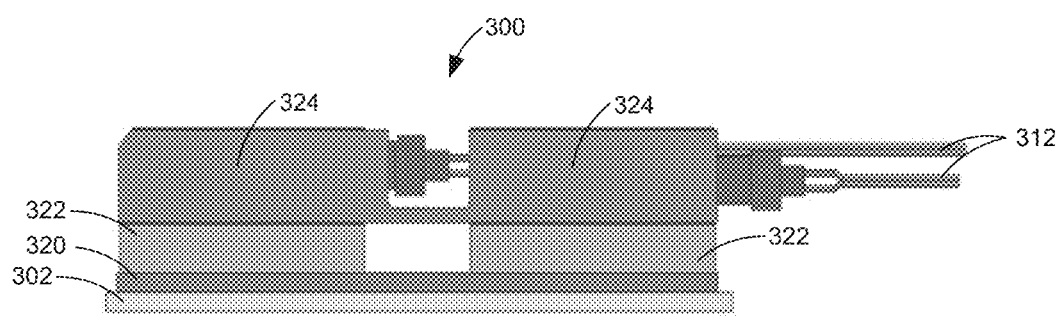

FIG. 8A illustrates a top view and FIG. 8B illustrates a side view of one example of 1x removable transceiver module 300 with module hood 306 removed. Transceiver module 300 includes a transceiver substrate 320, optical transceivers chips 322, optical connectors 324, and optical cables 312. Transceiver substrate 320 is electrically coupled to module board 302. Each optical transceiver chip 322 is electrically coupled to transceiver substrate 320 and optically coupled to optical cables 312 via optical connectors 324. In one example, each optical transceiver chip 322 supports 8-lanes such that transceiver module 300 is a 16-lane transceiver module.

Figure 9A:
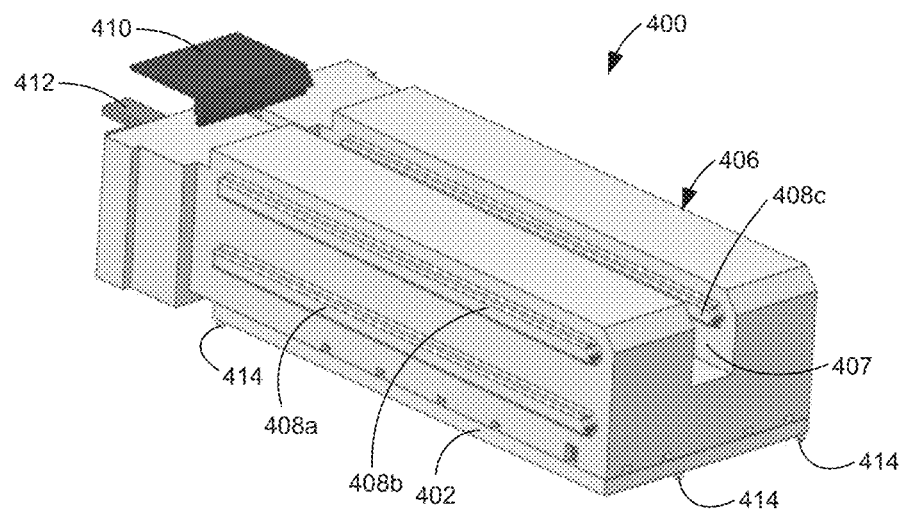
FIGS. 9A-9E illustrate various views of one example of a 2× removable transceiver module.
Figure 9B:
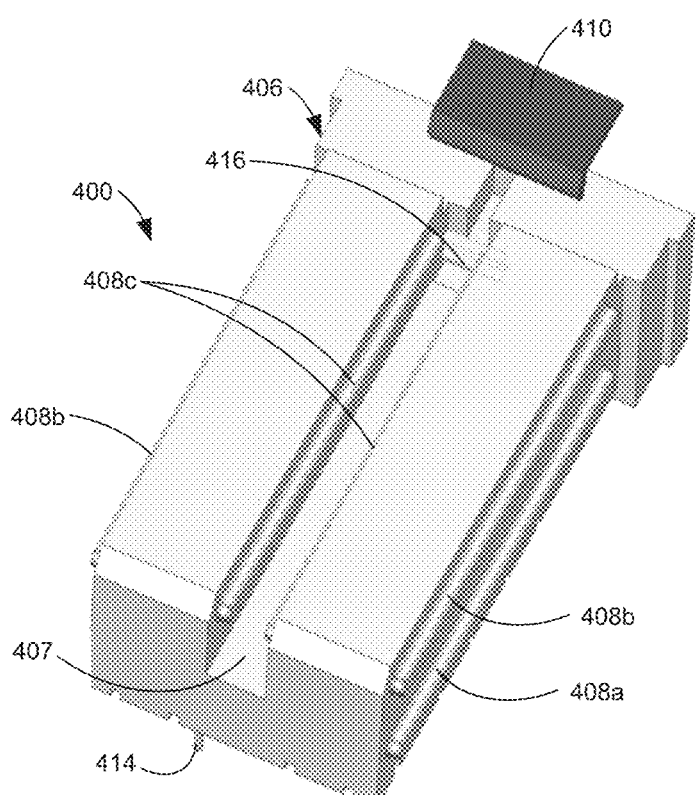
Figure 9C:
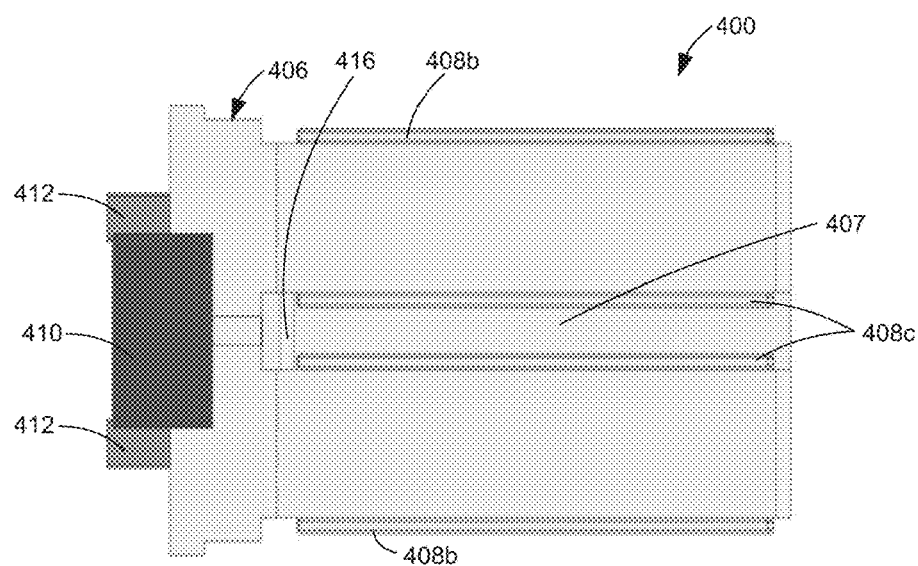
Figure 9D:
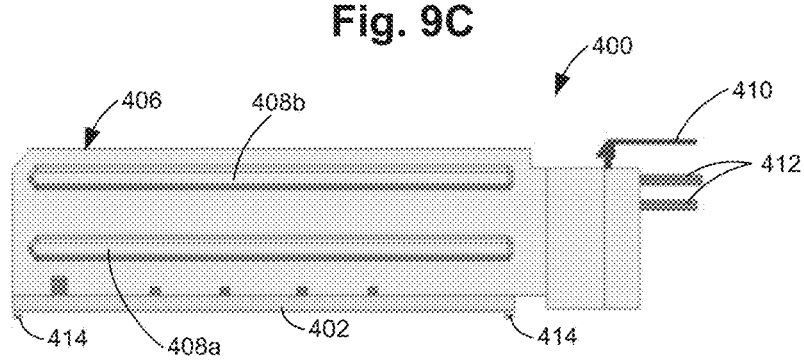
Figure 9E:
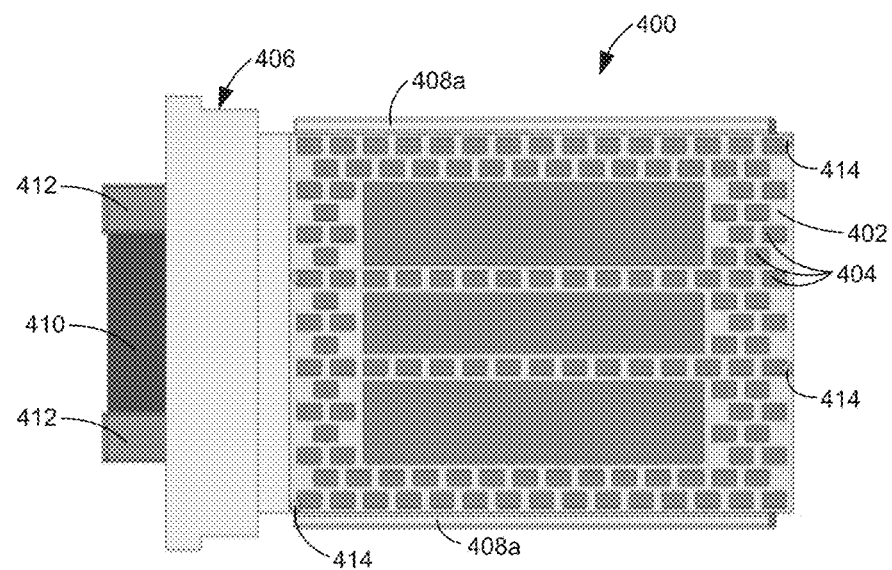

FIGS. 9A and 9B illustrate top isometric views, FIG. 9C illustrates a top view, FIG. 9D illustrates a side view, and FIG. 9E illustrates a bottom view of one example of a 2x removable transceiver module 400 (i.e., a 2x DALP transceiver module). Transceiver module 400 includes a module board 402, a module hood 406, a handle 410, and optical cables 412. As illustrated in FIG. 9E, module board 402 includes an array of parallel-plane-mating contacts 404 to electrically couple transceiver module 400 to a system. Module board 402 also includes final alignment pins 414 for aligning contacts 404 to a system board of a system. Transceiver devices (illustrated in FIG. 11) are electrically coupled to module board 402 and optically coupled to optical cables 412. Optical cables 412 may be fix-coupled to the transceivers for active optical cable (AOC) applications. In other examples, optical cables 412 may be coupled to the transceivers and terminated on optical connectors attached to module hood 406 for external optical cables to be modularly coupled to removable transceiver module 400.

Module hood 406 is attached to module board 402 and encloses the transceiver devices. Module hood 406 applies even pressure on module board 402 when transceiver module 400 is in the second position inside transceiver cage assembly 220. In one example, module hood 406 may include a heat sink material. In another example, module hood 406 may include openings such that air flow within a system may cool the transceivers. Module hood 406 includes guide rails 408a and 408b on outer side walls of module hood 406. A first guide rail 408a and a first guide rail 408b are arranged on a first side of module hood 406 and extend parallel to module board 402. A second guide rail 408a and a second guide rail 408b are arranged on a second side of module hood 406 opposite to the first side and extend parallel to module board 402. Guide rails 408a on opposite sides of module hood 406 extend in a common first plane a first distance from module board 402. Guide rails 408b on opposite sides of module hood 406 extend in a common second plane a second distance from module board 402 greater than the first distance.

Module hood 406 includes guide rails 408c on inner side walls of a notch 407 of module hood 406. As illustrated in FIG. 9C, a first guide rail 408c is arranged on a first inner side wall of notch 407, and a second guide rail 408c is arranged on a second inner side wall of notch 407 opposite to the first inner side wall. Each guide rail 408c extends parallel to module board 402 and may be coplanar with guide rails 408b. Module hood 406 also includes a locking tab 416 at the front end of notch 407. Locking tab 416 engages the locking mechanism 248 of each carrier 240a and 240b (FIG. 5) when transceiver module 400 is installed in transceiver cage assembly 220. Handle 410 is attached to and extends from the top of module hood 406 towards the front of transceiver module 400 where optical cables 412 are located. Handle 410 may be used to install transceiver module 400 in a system and to remove transceiver module 400 from a system.

Figure 10:
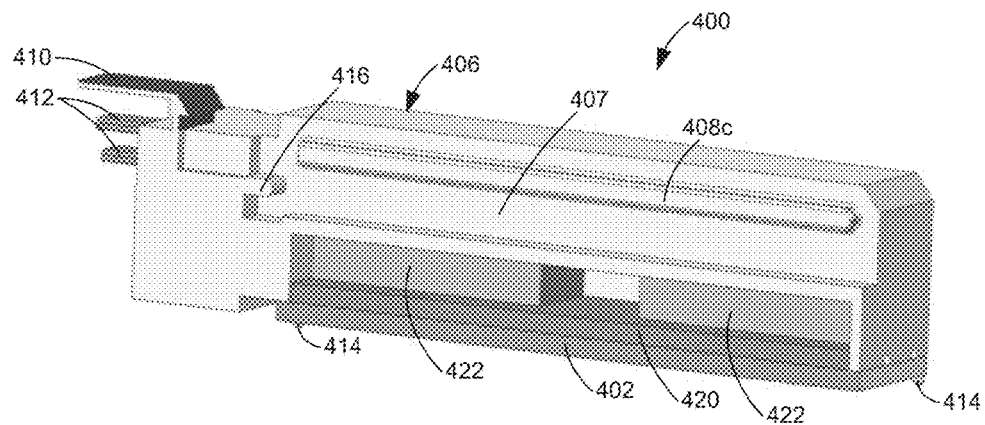
FIG. 10 illustrates a cross-sectional isometric view of one example of a 2× removable transceiver module.

FIG. 10 illustrates a cross-sectional isometric view of one example of 2x removable transceiver module 400 along notch 407. As previously described, a guide rail 408c is arranged on each inner side wall of notch 407 and locking tab 416 is arranged at the front end of notch 407. In addition, transceiver module 400 may include a transceiver substrate 420, optical transceivers chips 422, optical connectors (illustrated in FIG. 11), and optical cables 412. In this example, transceiver substrate 420 is electrically coupled to module board 402. In another example, the transceiver substrate 420 is also the module board 402. Each optical transceiver chip 422 is electrically coupled to transceiver substrate 420 and optically coupled to optical cables 412 via optical connectors.

Figure 11:
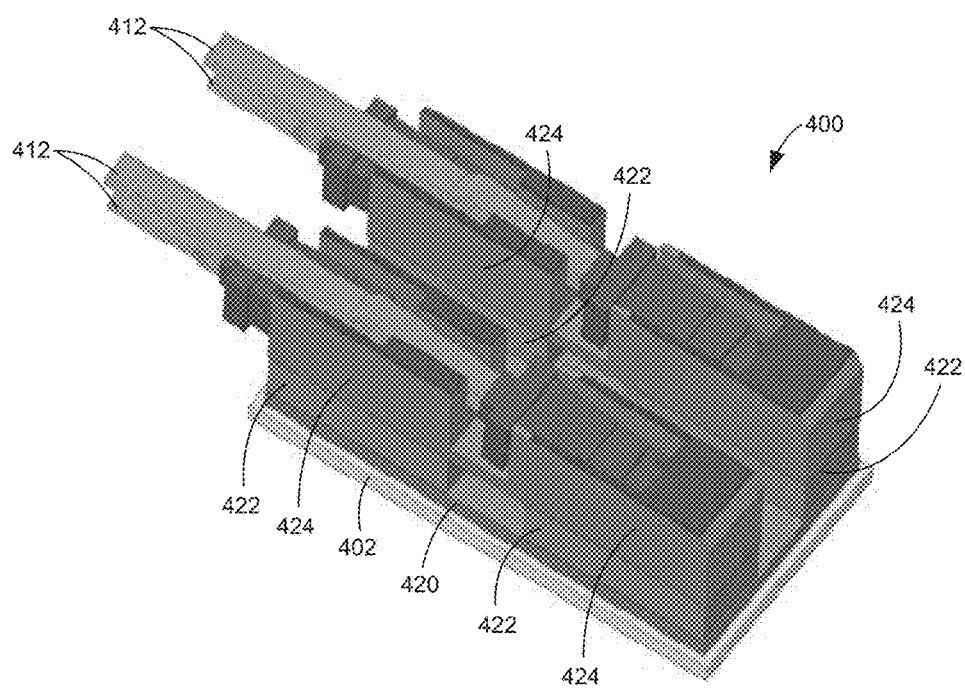
FIG. 11 illustrates a top isometric view of one example of a 2× removable transceiver module with the module hood removed.

FIG. 11 illustrates a top isometric view of one example of 2x removable transceiver module 400 with module hood 406 removed. Transceiver module 400 includes transceiver substrate 420, optical transceivers chips 422, optical connectors 424, and optical cables 412. Transceiver substrate 420 is electrically coupled to module board 402. In this example, a transceiver substrate 420 is shown for four transceiver chips 422. In another example, a transceiver substrate 420 may be used for each transceiver chip 422. Each optical transceiver chip 422 is electrically coupled to transceiver substrate 420 and optically coupled to optical cables 412 via optical connectors 424. In one example, each optical transceiver chip 422 supports 8-lanes such that transceiver module 400 is a 32-lane transceiver module.

Figure 12:
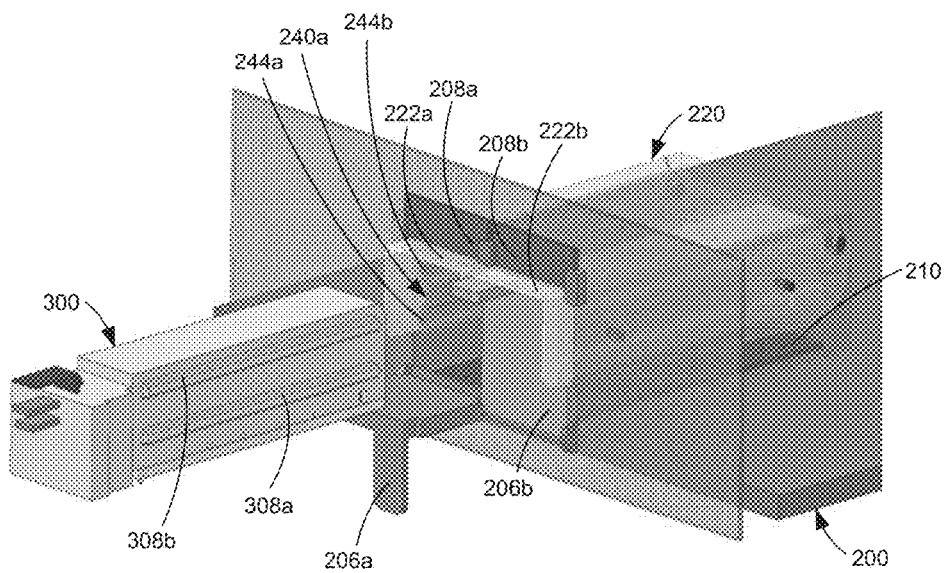
FIG. 12 illustrates one example of a first 1× removable transceiver module just prior to installation into a system.

FIG. 12 illustrates one example of a first 1x removable transceiver module 300 just prior to installation into a system 200. Prior to installing a transceiver module 300 in system 200, cover 206a is opened and sliding lid 208a and lever 222a are in the first (i.e., up) position. Guide rails 308a and 308b on one side of transceiver module 300 are then aligned with the carrier rails 244a and 244b, respectively, of carrier 240a. Guide rail 308b on the other side of transceiver module 300 is aligned with carrier rail 246 of carrier 240a (illustrated in FIG. 16). Transceiver module 300 is then laterally inserted into carrier 240a of transceiver cage assembly 220. Cover 206b may remain closed.

Figure 13:
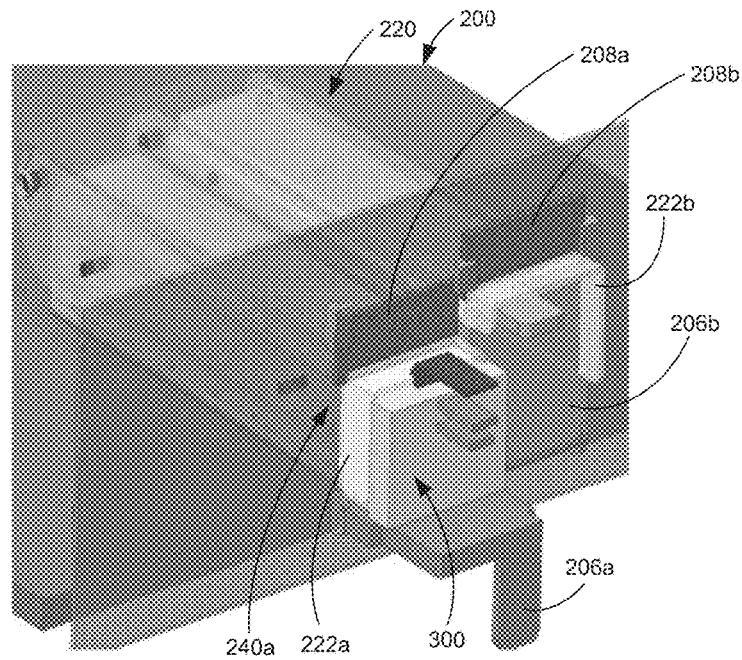
FIG. 13 illustrates one example of a first 1× removable transceiver module installed in a system.

FIG. 13 illustrates one example of a first 1x removable transceiver module 300 installed in system 200. Transceiver module 300 is inserted laterally into transceiver cage assembly 220 until the transceiver module hits a stop. Guide rails 308a and 308b on one side of transceiver module 300 are received by carrier rails 244a and 244b, respectively, on the outer side wall of carrier 240a. Carrier rail 308b on the other side of transceiver module 300 is received by carrier rail 246 on the inner side wall of carrier 240*a* (illustrated in FIG. 16). With transceiver module 300 fully laterally inserted into transceiver cage assembly 220, the contacts of module board 302 are aligned with the contacts of the socket contact assembly 210 on the system board 202 (illustrated in FIG. 21A where transceiver module 500 may be transceiver module 300 and module board 502 may be module board 302). In addition, a portion of transceiver module 300, including handle 310, may remain outside of transceiver cage assembly 220.

With the contacts of removable transceiver module 300 aligned with the contacts of the socket contact assembly 210, lever 222*a* is moved to the second (i.e., down) position. By pivoting lever 222*a* to the second position, carrier 240*a* and thus transceiver module 300 is moved vertically within transceiver cage assembly 220 such that transceiver module 300 blindmates to socket contact assembly 210 (illustrated in FIG. 21B where transceiver module 500 may be transceiver module 300 and module board 502 may be module board 302). With lever 222*a* in the second position, sliding lid 208*a* may be slid down to maintain lever 222*a*, and thus carrier 240*a* in the second position such that transceiver module 300 remains electrically coupled to socket contact assembly 210.

Figure 14:
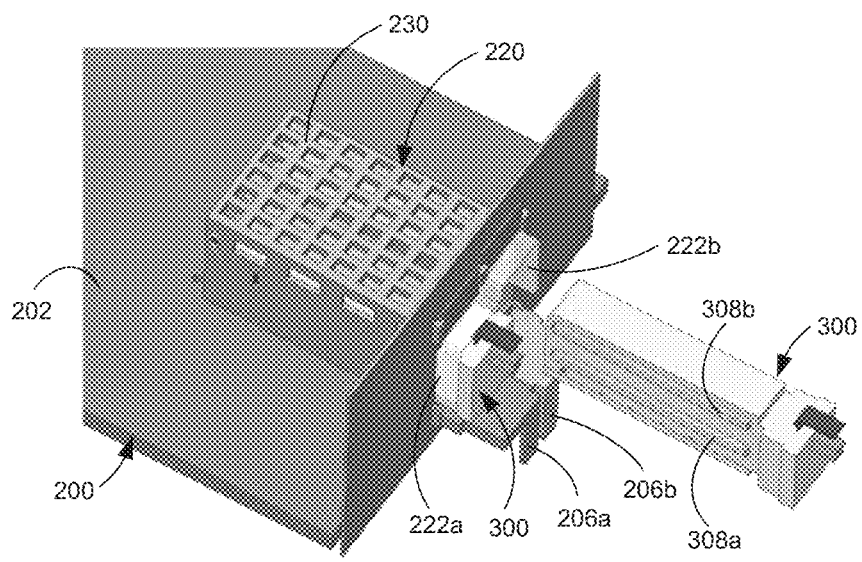
FIG. 14 illustrates one example of a second 1× removable transceiver module just prior to installation into a system.

FIG. 14 illustrates one example of a second 1x removable transceiver module 300 just prior to installation into system 200. Prior to installing a second transceiver module 300 in system 200, cover 206*b* is opened and sliding lid 208*b* and lever 222*b* are in the first (i.e., up) position. Guide rails 308*a* and 308*b* on one side of transceiver module 300 are then aligned with the carrier rails 244*a* and 244*b*, respectively, of carrier 240*b* (FIG. 5). Guide rail 308*b* on the other side of transceiver module 300 is aligned with carrier rail 246 of carrier 240*b* (partially illustrated in FIG. 16). Transceiver module 300 is then laterally inserted into carrier 240*b* (FIG. 5) of transceiver cage assembly 220.

Figure 15:
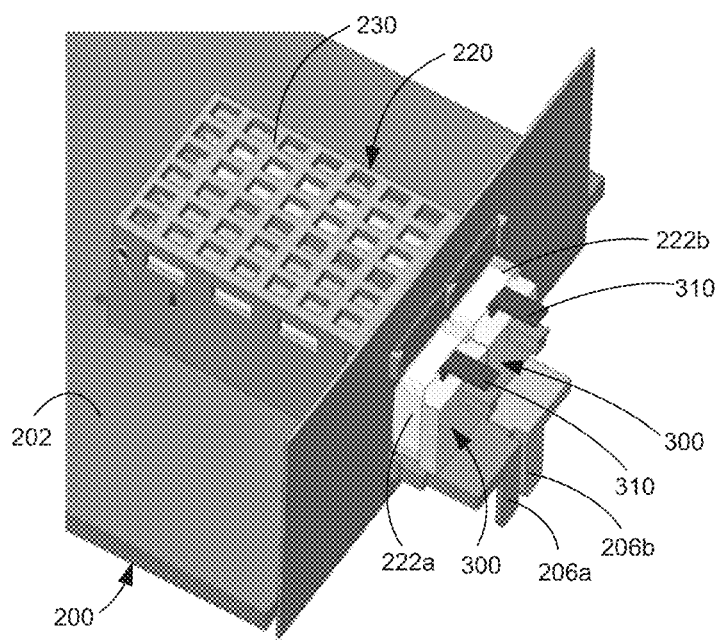
FIG. 15 illustrates one example of two 1× removable transceiver modules installed in a system.
Figure 16:
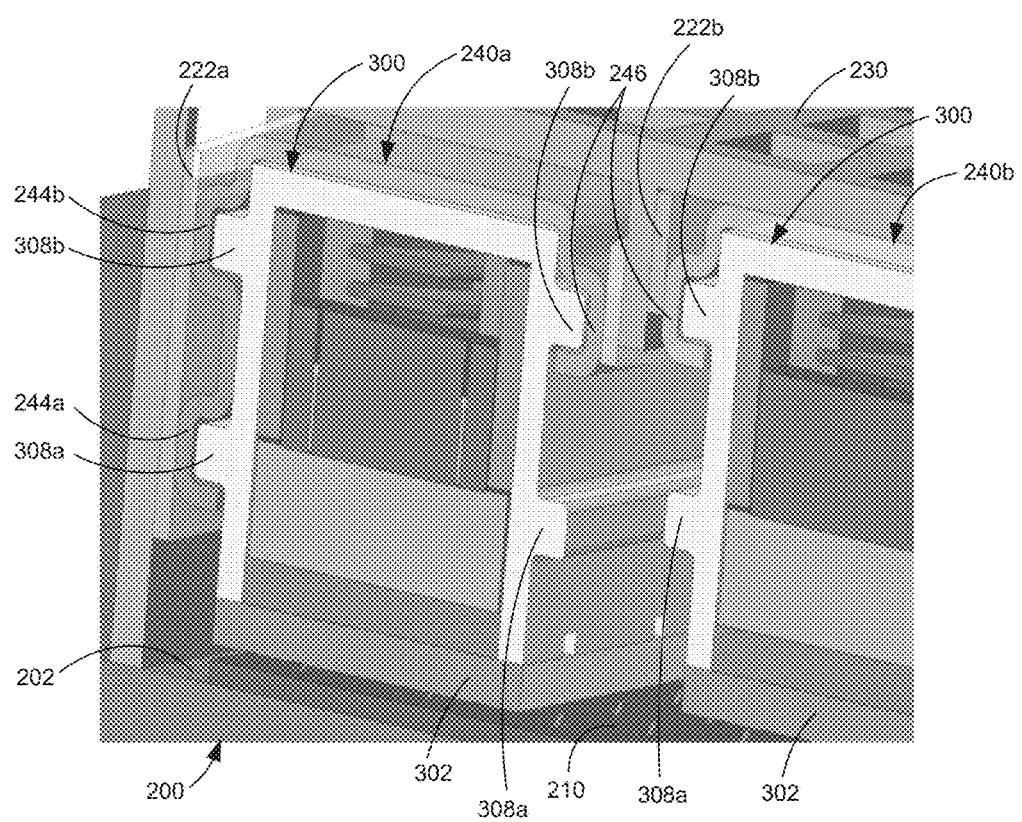
FIG. 16 illustrates a cross-sectional view of one example of two 1× removable transceiver modules in a system.

FIG. 15 illustrates an isometric view and FIG. 16 illustrates a cross-sectional view of one example of two 1x removable transceiver modules 300 in system 200. The second transceiver module 300 is inserted laterally into transceiver cage assembly 220 until the transceiver module hits a stop. Guide rails 308*a* and 308*b* on one side of transceiver module 300 are received by carrier rails 244*a* and 244*b*, respectively, on the outer side wall of carrier 240*b*. Carrier rail 308*b* on the other side of transceiver module 300 is received by carrier rail 246 on the inner side wall of carrier 240*b* (partially illustrated in FIG. 16). With the second transceiver module 300 fully laterally inserted into transceiver cage assembly 220, the contacts of module board 302 are aligned with the contacts of the socket contact assembly 210 on the system board 202 (illustrated in FIG. 21A where transceiver module 500 may be transceiver module 300 and module board 502 may be module board 302). In addition, a portion of the second transceiver module 300, including handle 310, may remain outside of transceiver cage assembly 220.

With the contacts of removable transceiver module 300 aligned with the contacts of the socket contact assembly 210, lever 222*b* is moved to the second (i.e., down) position. By pivoting lever 222*b* to the second position, carrier 240*b* and thus transceiver module 300 is moved vertically within transceiver cage assembly 220 such that transceiver module 300 blindmates to socket contact assembly 210 (illustrated in FIG. 21B where transceiver module 500 may be transceiver module 300 and module board 502 may be module board 302). With lever 222*b* in the second position, sliding lid 208*b* may be slid down to maintain lever 222*b*, and thus carrier 240*b* in the second position such that transceiver module 300 remains electrically coupled to socket contact assembly 210.

Figure 17:
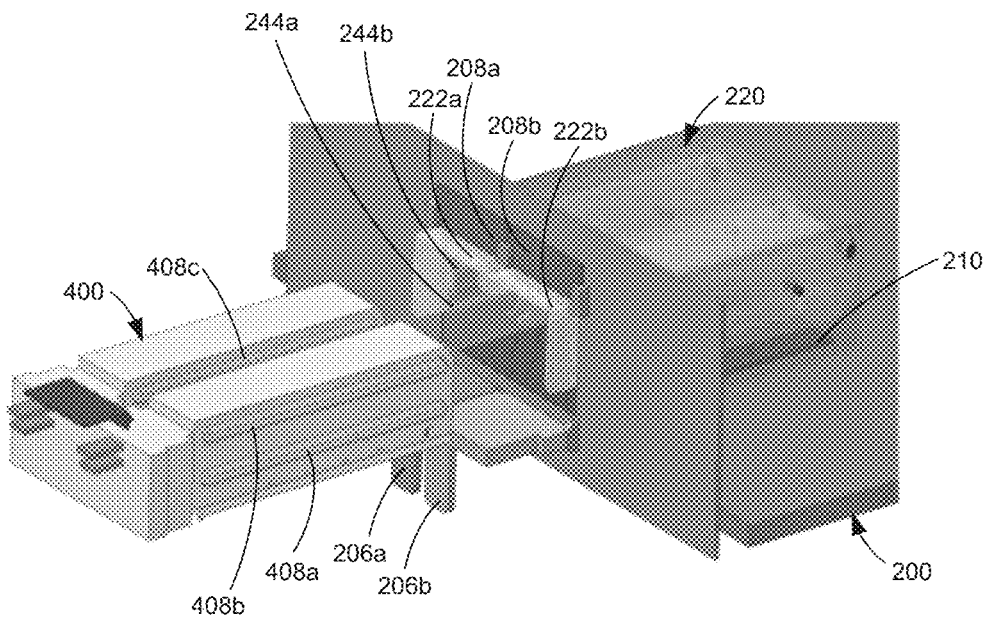
FIG. 17 illustrates one example of a 2× removable transceiver module just prior to installation into a system.

FIG. 17 illustrates one example of a 2x removable transceiver module 400 just prior to installation into system 200. Prior to installing a transceiver module 400 in system 200, covers 206*a* and 206*b* are opened and sliding lids 208*a* and 208*b* and levers 222*a* and 222*b* are in the first (i.e., up) position. Guide rails 408*a* and 408*b* on each side of transceiver module 400 are then aligned with the carrier rails 244*a* and 244*b* of first carrier 240*a* and second carrier 240*b*, respectively. Guide rails 408*c* of transceiver module 400 are aligned with carrier rails 246 of first carrier 240*a* and second carrier 240*b*, respectively (illustrated in FIG. 20A). Transceiver module 400 is then laterally inserted into carriers 240*a* and 240*b* of transceiver cage assembly 220.

Figure 18:
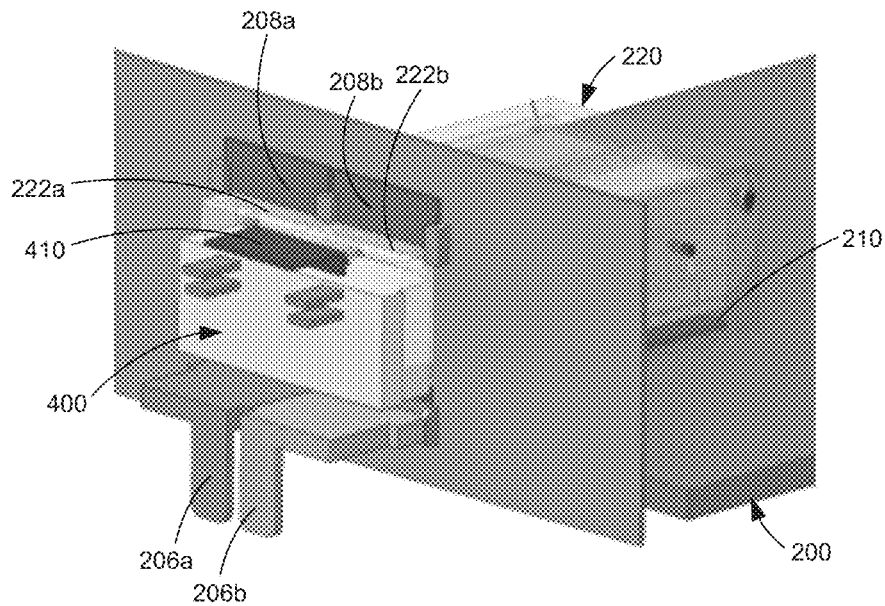
FIG. 18 illustrates one example of a 2× removable transceiver module in a system.

FIG. 18 illustrates one example of a 2x removable transceiver module 400 installed in system 200. Transceiver module 400 is inserted laterally into transceiver cage assembly 220 until the transceiver module hits a stop. Guide rails 408*a* and 408*b* on each side of transceiver module 400 are received by carrier rails 244*a* and 244*b* on the outer side walls of carriers 240*a* and 240*b*, respectively. Carrier rails 408*c* of transceiver module 400 are received by carrier rails 246 on the inner side walls of carriers 240*a* and 240*b*, respectively (illustrated in FIG. 20A). With transceiver module 400 fully laterally inserted into transceiver cage assembly 220, the contacts of module board 402 are aligned with the contacts of the socket contact assembly 210 on the system board 202 (illustrated in FIG. 21A where transceiver module 500 may be transceiver module 400 and module board 502 may be module board 402). In addition, a portion of transceiver module 400, including handle 410, may remain outside of transceiver cage assembly 220.

Figure 20A:
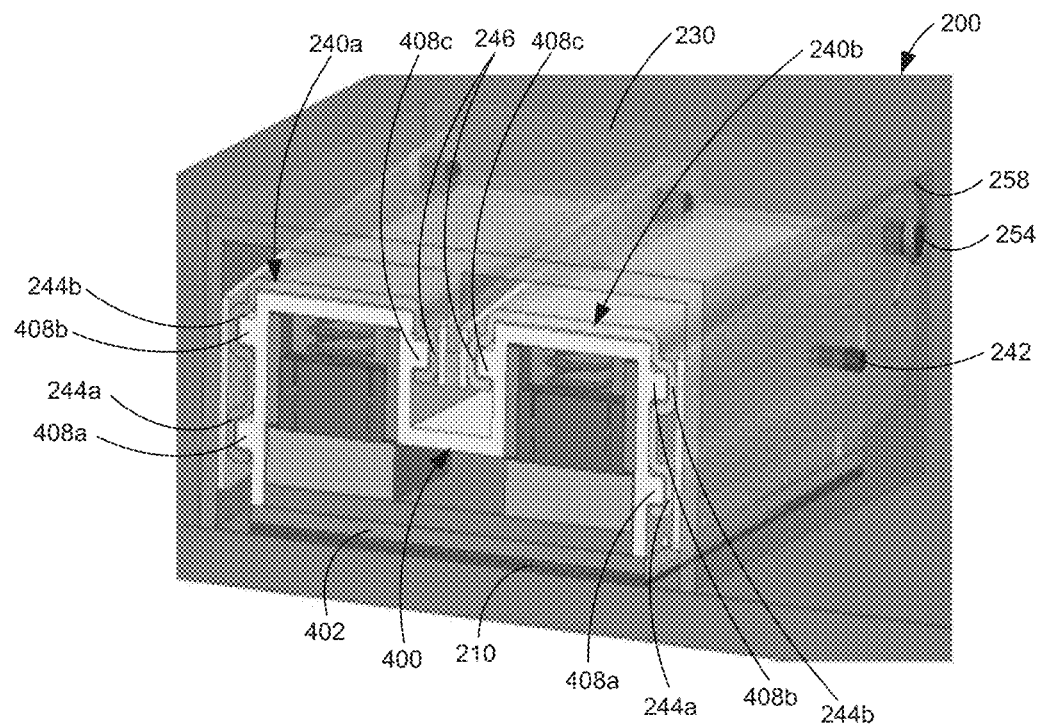
FIG. 20A illustrates a cross-sectional isometric view and FIG. 20B illustrates a cross-sectional front view of one example of a 2× removable transceiver module installed in a system.
Figure 20B:
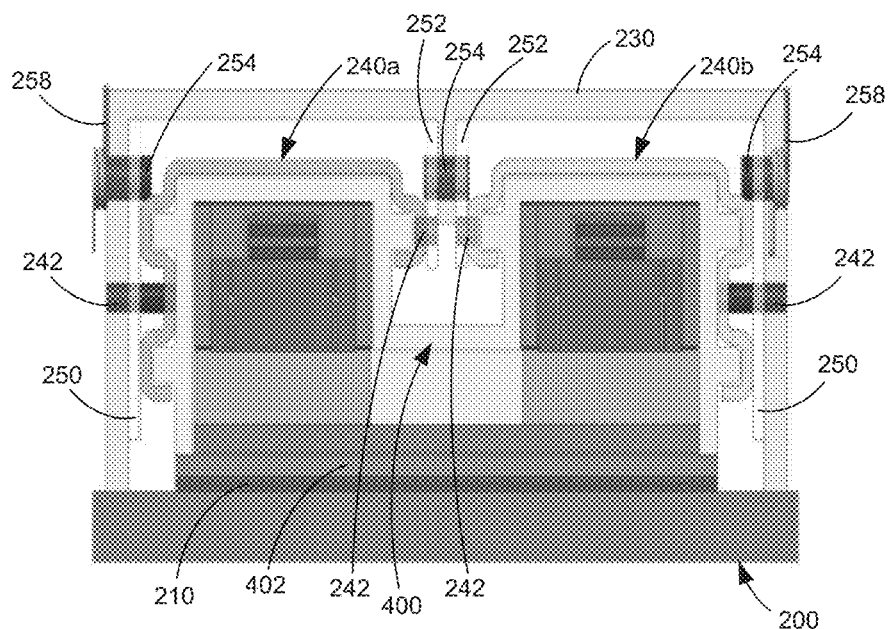

With the contacts of removable transceiver module 400 aligned with the contacts of the socket contact assembly 210, levers 222*a* and 222*b* are moved from the first (i.e., up) position as illustrated in FIG. 18, to the second (i.e., down) position (illustrated in FIGS. 20A and 20B). By pivoting levers 222*a* and 222*b* to the second position, carriers 240*a* and 240*b* and thus transceiver module 400 is moved vertically within transceiver cage assembly 220 such that transceiver module 400 blindmates to socket contact assembly 210 as illustrated in FIGS. 20A and 20B (also illustrated in FIG. 21B where transceiver module 500 may be transceiver module 400 and module board 502 may be module board 402). With levers 222*a* and 222*b* in the second position, sliding lids 208*a* and 208*b* may be slid down to maintain levers 222*a* and 222*b*, and thus carriers 240*a* and 240*b* in the second position such that transceiver module 400 remains electrically coupled to socket contact assembly 210.

Figure 19:
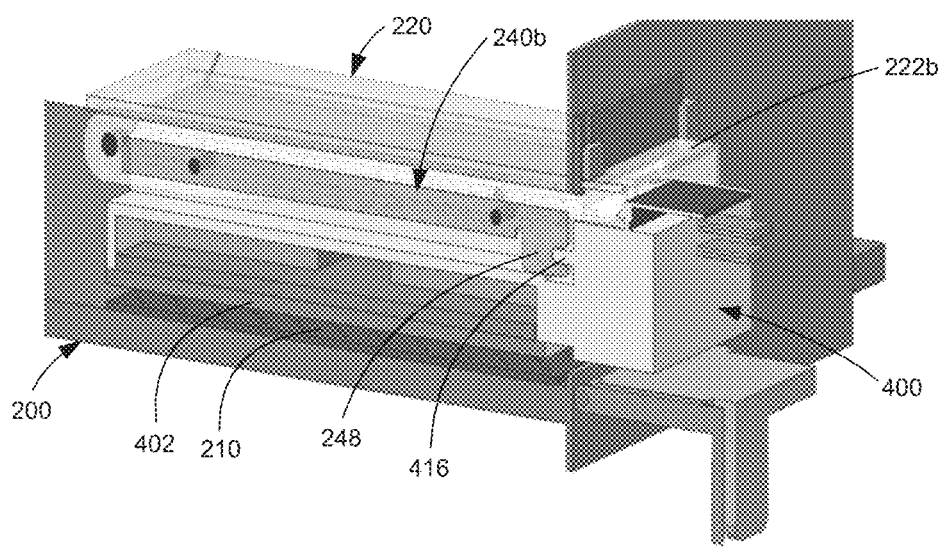
FIG. 19 illustrates a cross-sectional view of one example of a 2× removable transceiver module in a system.

FIG. 19 illustrates a cross-sectional view of one example of 2x removable transceiver module 400 installed in system 200. With transceiver module 400 installed in transceiver cage assembly 220, locking tab 416 engages locking mechanism 248 of each carrier 240*a* and 240*b*. With locking tab 416 engaged with each locking mechanism 248 of each carrier 240*a* and 240*b*, levers 222*a* and 222*b* and carriers 240*a* and 240*b* move together within transceiver cage assembly 220.

Figure 21A:
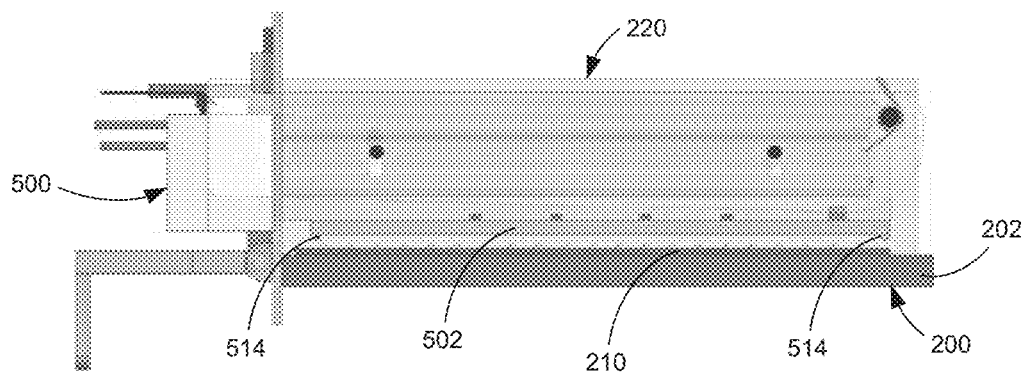
FIG. 21A illustrates a side view of one example of a system and a removable transceiver module with the lever in the first position.

FIG. 21A illustrates a side view of one example of system 200 and a removable transceiver module 500 with the lever in the first position. Transceiver module 500 may be a 1x removable transceiver module, such as 1x removable transceiver module 300, or a 2x removable transceiver module, such as 2x removable transceiver module 400. Transceiver module 500 includes a module board 502. Module board 502 includes an array of parallel-plane-mating contacts (not shown) to electrically couple transceiver module 500 to system 200. Module board 502 also includes final alignment pins 514 for aligning the parallel-plane mating contacts to socket contact assembly 210.

Figure 21B:
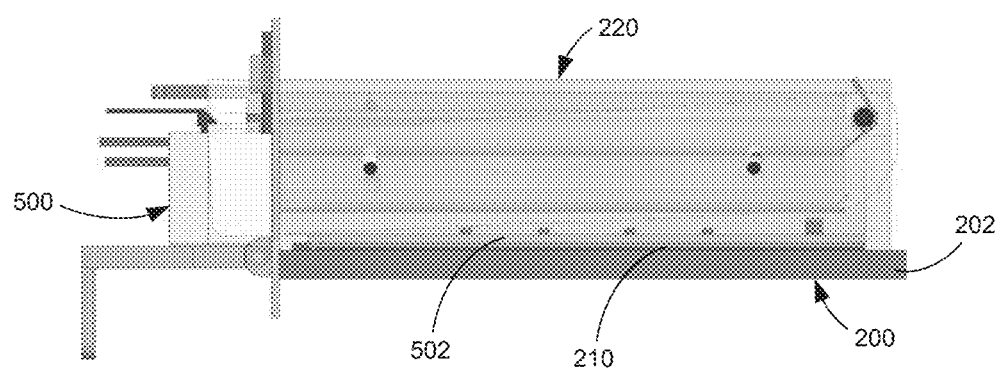
FIG. 21B illustrates a side view of one example of a system with an installed removable transceiver module.

FIG. 21B illustrates a side view of one example of system 200 with an installed transceiver module 500. Transceiver module 500 is inserted laterally into transceiver cage assembly 220 until the transceiver module hits a stop. With transceiver module 500 fully laterally inserted into transceiver cage assembly 220, the contacts of module board 502 are aligned with the contacts of the socket contact assembly 210 on the system board 202. With the contacts of removable transceiver module 500 aligned with the contacts of the socket contact assembly 210, the lever is moved to the second (i.e., down) position. By pivoting the lever to the second position, transceiver module 500 is moved vertically within transceiver cage assembly 220 such that transceiver module 500 blindmates to socket contact assembly 210.

Figure 22:
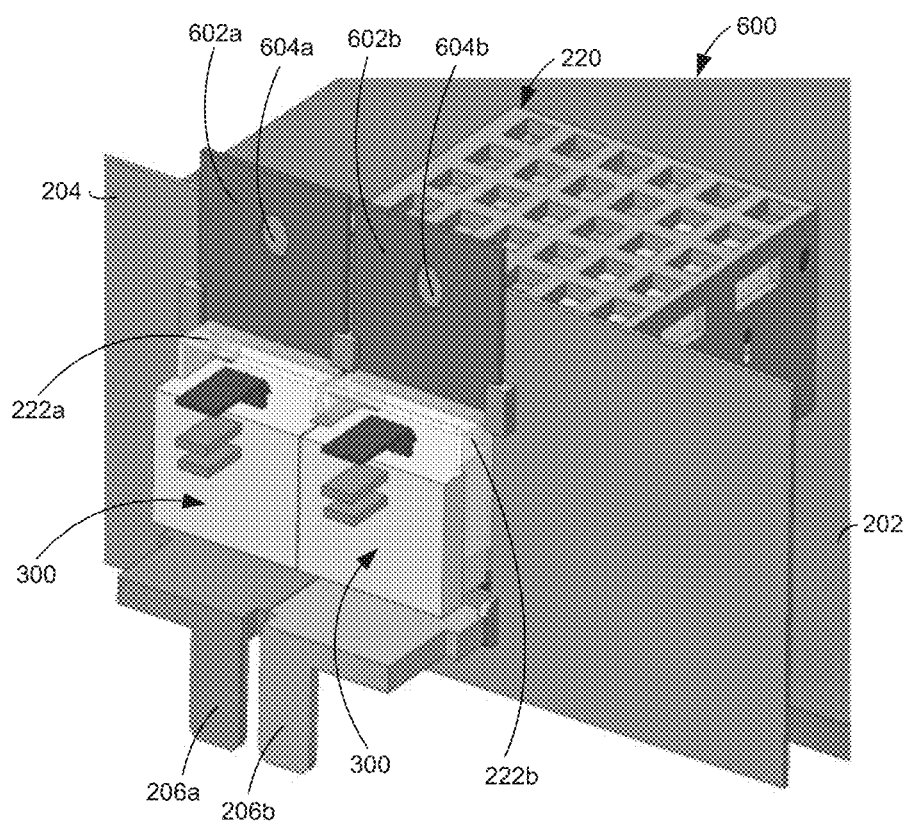
FIG. 22 illustrates an isometric view of one example of a system with two 1× removable transceiver modules with the levers in the first position.

FIG. 22 illustrates an isometric view of one example of a system 600 with two 1x removable transceiver modules 300 with levers 222a and 222b in the first position. System 600 includes a system board 202, a faceplate 204 perpendicular to system board 202, covers 206a and 206b, and a transceiver cage assembly 220. In addition, system 600 includes a first sliding lid 602a coupled to faceplate 204 above first lever 222a and a second sliding lid 602b coupled to faceplate 204 above second lever 222b.

Each sliding lid 602a and 602b is movable to a first (i.e., up) position when the respective lever 222a and 222b is in the first (i.e., up) position. Each sliding lid 602a and 602b is movable to a second (i.e., down) position when the respective lever 222a and 222b is in the second (i.e., down) position. When each sliding lid 602a and 602b is in the second position, each sliding lid prevents air flow and EMI/RFI leakage from system 600 through and around the transceiver modules 300. Each sliding lid 602a and 602b includes a respective opening 604a and 604b, which is engaged by a respective sliding lid latch (illustrated in FIGS. 23A and 23B) when each sliding lid 602a and 602b is in the second position.

Figure 23A:
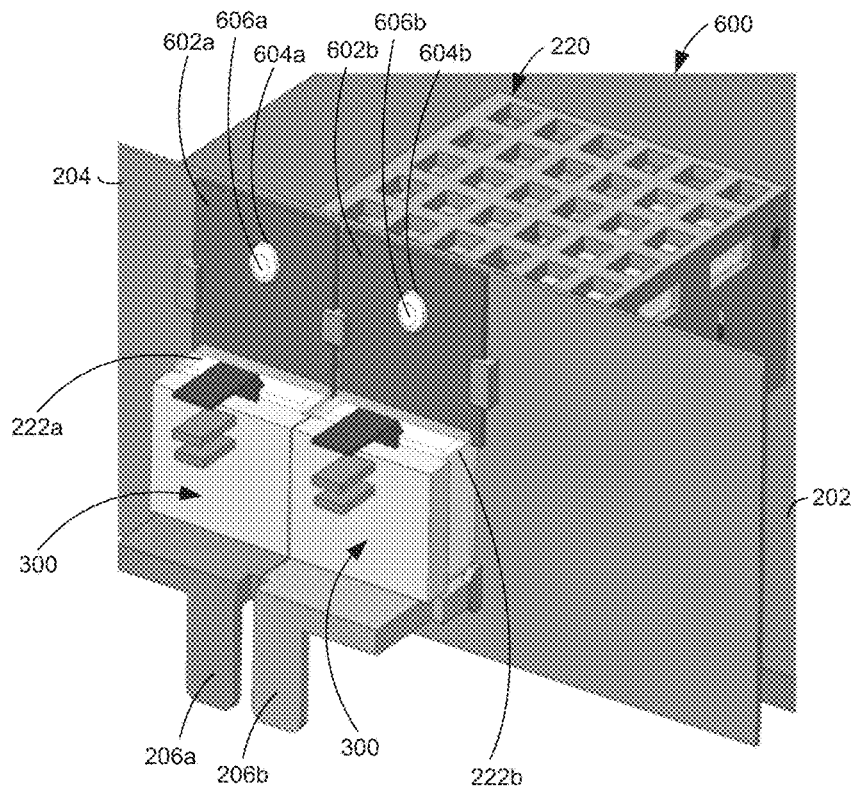
FIG. 23A illustrates a front isometric view and FIG. 23B illustrates a back isometric view of one example of a system with two 1× removable transceiver modules installed.
Figure 23B:
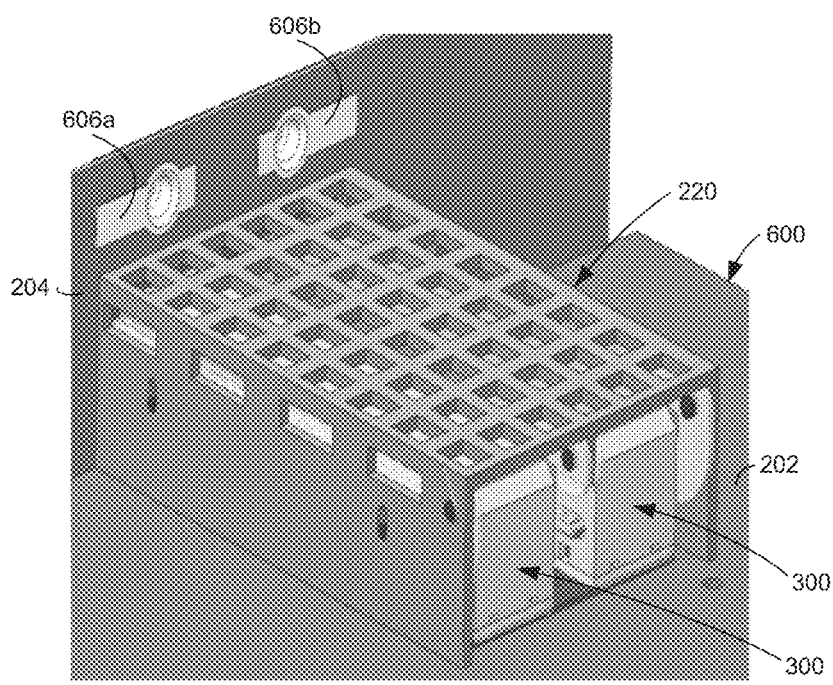

FIG. 23A illustrates a front isometric view and FIG. 23B illustrates a back isometric view of one example of system 600 with two 1x transceiver modules 300 installed. System 600 includes a first sliding lid latch (e.g., lock) 606a and a second sliding lid latch (e.g., lock) 606b. By pivoting each lever 222a and 222b to the second position, each respective transceiver module 300 is moved vertically within transceiver cage assembly 220 such that each transceiver module 300 blindmates to system board 202. With each lever 222a and 222b in the second position, each sliding lid 602a and 602b may be slid down such that each opening 604a and 604b of each sliding lid 602a and 602b engages with the sliding lid latch 606a and 606b, respectively. With each sliding lid engaged with the sliding lid latch, each respective lever 222a and 222b is maintained in the second position such that each respective transceiver module 300 remains electrically coupled to system board 202. In one example, each sliding lid latch 606a and 606b is a spring latch that may be released by pressing on the latch through the opening 604a and 604b when the latch is engaged with the opening 604a and 604b, respectively.

Examples of DALP transceiver modules described herein have a footprint that can support a larger and variable number of lanes on one PCB or substrate compared to pluggable transceiver modules that use right-angle connectors and two PCBs (e.g., CXP and CDFP), thereby enabling more efficient use of the space available on a system board. The contacts of the DALP transceiver modules provide better signal integrity and are more easily scaled than right-angle connectors of other pluggable transceiver modules. The DALP transceiver modules are completely inside a system faceplate and the cage may have openings for better cooling of thermally-sensitive transceivers allowing higher component and system reliability. The DALP transceiver modules may be hot-pluggable, simplifying servicing and upgrading of network systems without powering down the systems. The DALP transceiver modules may be hot-pluggable transceiver modules with optical connectors for modular optical cables to be optically coupled, or may have optical cables fix-attached on faceplates for hot-pluggable AOC applications. Further, since a DALP transceiver module can support a higher number of lanes than other pluggable transceiver modules and may use less space, electromechanical overhead is lower, which may enable lower overall system costs.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
   a system board comprising first contacts and second contacts;
   a cage attached to the system board, the cage comprising a first side over the first contacts and a second side over the second contacts;
   a first lever coupled to the first side of the cage and pivotable with respect to the cage;
   a second lever coupled to the second side of the cage and pivotable with respect to the cage;
   a removable transceiver module comprising third contacts, the transceiver module installable in at least one of the first side and the second side of the cage,
   wherein the first lever is movable to a first position to align the third contacts with the first contacts and to a second position to electrically couple the third contacts to the first contacts with the transceiver module installed in at least the first side of the cage and a first sliding lid, movable to an up position and a down position, to maintain the first lever in the second position when the first sliding lid is in the down position, and
   wherein the second lever is movable to a first position to align the third contacts with the second contacts and to a second position to electrically couple the third contacts to the second contacts with the transceiver module installed in at least the second side of the cage and a second sliding lid to maintain the second lever in the second position.

2. The system of claim 1, further comprising:
   a first carrier within the first side of the cage and movable with respect to the cage, the first carrier to receive the transceiver module; and
   a second carrier within the second side of the cage and movable with respect to the cage, the second carrier to receive the transceiver module, wherein the first lever is between the first carrier and the cage, and wherein the second lever is between the second carrier and the cage.

3. The system of claim 2, further comprising
the first sliding lid to prevent air flow and EMI/RFI leakage with one first transceiver module or the second transceiver module installed in the first carrier; and
the second sliding lid to prevent air flow and EMI/RFI leakage with one first transceiver module or the second transceiver module installed in the second carrier.

4. The system of claim 1, wherein the transceiver module comprises alignment pins to align the third contacts with at least one of the first contacts and the second contacts with the transceiver module installed in the cage.

5. The system of claim 1, wherein the cage comprises an opening to expose the transceiver module to air flow with the transceiver module installed in the cage.

6. The system of claim 1, wherein the transceiver module is a 1x transceiver module installable in one of the first side and the second side of the cage, and
wherein the first lever and the second lever pivot independently of each other with respect to the cage.

7. The system of claim 1, wherein the transceiver module is a 2x transceiver module installable in both the first side and the second side of the cage, and
wherein the 2x transceiver module comprises a locking mechanism such that the first lever and the second lever pivot together with respect to the cage.

8. A device comprising:
a system board having contacts to electrically couple to two first removable transceiver modules or one second removable transceiver module;
a cage coupled to the system board over the contacts;
a first carrier within the cage and movable with respect to the cage, the first carrier to receive one first transceiver module or a portion of the second transceiver module;
a second carrier within the cage and movable with respect to the cage, the second carrier to receive one first transceiver module or another portion of the second transceiver module;
a first lever between the cage and the first carrier, the first lever pivotable with respect to the cage and movable to a first position to align one first transceiver module or the second transceiver module with the contacts and to a second position to electrically couple one first transceiver module or the second transceiver module to the contacts and a first sliding lid, movable to an up position and a down position, to maintain the first lever in the second position when the first sliding lid is in the down position; and
a second lever between the cage and the second carrier, the second lever pivotable with respect to the cage and movable to a first position to align one first transceiver module or the second transceiver module with the contacts and to a second position to electrically couple one first transceiver module or the second transceiver module to the contacts and a second sliding lid to maintain the second lever.

9. The device of claim 8, further comprising:
the first sliding lid to prevent air flow and EMI/RFI leakage with one first transceiver module or the second transceiver module installed in the first carrier; and
the second sliding lid to prevent air flow and EMI/RFI leakage with one first transceiver module or the second transceiver module installed in the second carrier.

10. The device of claim 9, further comprising:
a first lever spring to maintain the first lever in the first position without one first transceiver module or the second transceiver module installed in the first carrier; and
a second lever spring to maintain the second lever in the first position without one first transceiver module or the second transceiver module installed in the second carrier.

11. The device of claim 9, further comprising:
a first cover pivotable with respect to the cage, the first cover movable to a closed position covering an opening to the first carrier and to an open position such that one first transceiver module or the second transceiver module is installable in the first carrier; and
a second cover pivotable with respect to the cage, the second cover movable to a closed position covering an opening to the second carrier and to an open position such that one first transceiver module or the second transceiver module is installable in the second carrier.

12. A device comprising:
a module board having a first side and a second side, the first side comprising contacts to electrically couple to contacts of a system board;
a transceiver electrically coupled to the second side of the module board; and
a module hood coupled to the module board and enclosing the transceiver, the module hood comprising guides on sides of the module hood,
wherein the device is to be installed into a system comprising a cage and two carriers within the cage,
wherein the module hood is to be inserted into at least one of the two carriers, and
wherein each carrier includes a sliding lid, movable to an up position and a down position, to maintain a position of an inserted module hood when the first sliding lid is in the down position.

13. The device of claim 12, wherein the module hood is to be inserted into both of the two carriers, the device further comprising:
a locking mechanism such that with the device inserted into both of the two carriers, both of the two carriers move together with respect to the cage.

14. The device of claim 12, wherein the module hood is to be inserted into one of the two carriers, and
wherein the guides comprise rails extending on opposite sides of the module hood.

15. The device of claim 12, wherein the module hood is to be inserted into both of the two carriers, and
wherein the guides comprise rails extending on opposite side of the module hood and on a center portion of the module hood.

* * * * *